(No Model.)
M. S. MICHAELIS.
COTTON CHOPPER.
No. 270,824. Patented Jan. 16, 1883.
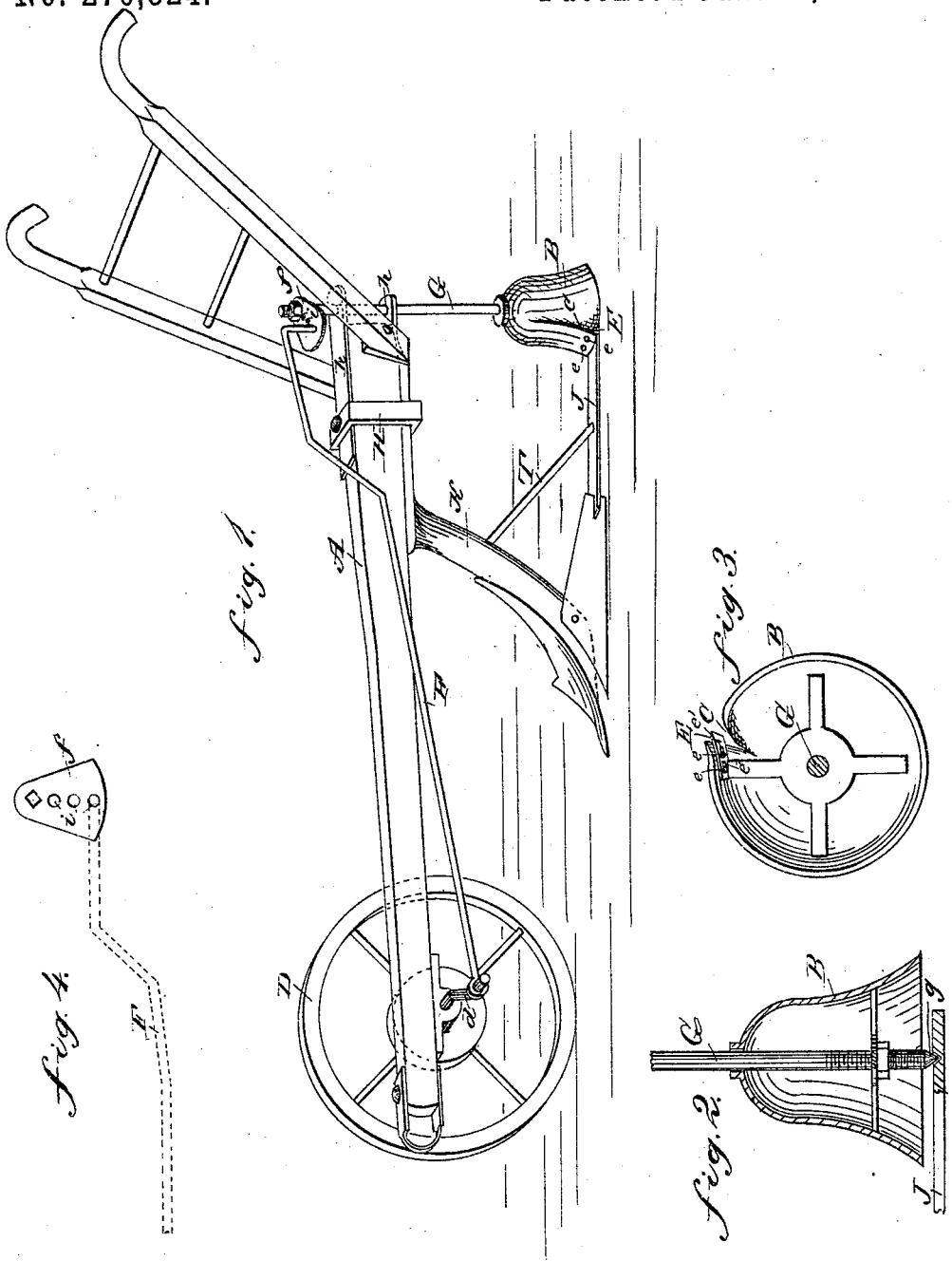
WITNESSES:
INVENTOR:
M. S. Michaelis
BY Munn & Co.
ATTORNEYS.

UNITED STATES PATENT OFFICE.

MARTIN S. MICHAELIS, OF BENTON, LOUISIANA.

COTTON-CHOPPER.

SPECIFICATION forming part of Letters Patent No. 270,824, dated January 16, 1883.

Application filed July 25, 1882. (No model.)

*To all whom it may concern:*

Be it known that I, MARTIN S. MICHAELIS, of Benton, in the parish of Bossier and State of Louisiana, have invented a new and Improved Cotton-Chopper, of which the following is a full, clear, and exact description.

My invention consists principally of a slotted bell-shaped cutter, adapted to be attached to any plow, and to receive rotary reciprocating motion from a drive-wheel attached to the plow, and in providing the cutter with an adjustable knife for closing more or less the slot in the cutter, so that the latter will leave a greater or less number of plants in the stand, as desired.

The invention also consists of the construction, arrangement, and combination of parts, all as hereinafter more fully described.

Reference is to be had to the accompanying drawings, forming part of this specification, in which similar letters of reference indicate corresponding parts in all the figures.

Figure 1 is a perspective view of a plow having my new and improved cotton-chopper attached thereto. Fig. 2 is a sectional elevation of the bell-shaped cutter. Fig. 3 is a plan view of the under side of the cutter, showing the position of the adjustable knife, and Fig. 4 is a plan view of the crank secured to the upper end of the shaft G of the cutter.

A represents the plow, which may be of any approved construction.

B represents the cutter, which is by preference made bell-shaped, and is formed with the slot C; and D is the drive-wheel, attached near to the forward end of the beam of the plow; and E represents the adjustable knife, placed inside of the cutter, and F is the connecting-rod that connects the crank $d$ of the drive-wheel with the crank $f$ of the shaft G of the cutter. The cutter is attached to the plow by means of the journal-plates $h\ h$, in which the shaft G of the cutter is journaled at or near its upper end, and the rearwardly-extending plate or bar J, which is formed with a socket near its rear end to receive the lower end or point, $g$, of the shaft G, as shown in Fig. 2. The plates $h\ h$ are secured to the rear end of the beam of the plow by means of the band H, or any other similar means may be used, and the rearwardly-extending bar, J, is bolted or otherwise secured to the rear end of the landside of the plow. When the cutter is put in place it should be so arranged in the plates $h\ h$ and rod or plate J that the slot C will stand toward the left side of the plow.

By the means described for attaching the colter it will be seen that the shaft G of the cutter will be held in line with the landside of the plow, so that one-half of the diameter of the cutter will reach outside of the plow to the left, and will reach over the row of plants being chopped out.

In use, the rows or drills of cotton are first furrowed off along one side by the plow, or a plow without the cutter attached. The cutter is then attached to the plow, and the plow is run along the other or unfurrowed side of the rows. The cutter, reaching over the row, will cut out all of the plants in the row until the slot C is brought by the rotary reciprocating movement which the cutter receives from the drive-wheel in line with the row of plants. When in this position the cutter will skip the plants in the row until it is turned back so that the slot C is no longer in line with the row, when the cutter will again cut all of the plants in the row. The cutter having a regular rotary reciprocating motion, the plants will be skipped regularly, making hills at regular intervals along the row, provided with standing plants opposite the slot C in the rotary reciprocating movement of the cutter B.

The distance between the hills may be increased or diminished, as desired, by changing the connecting-rod F in the series of holes $i$ made in the crank F.

The rod or plate J is braced by the rod T, reaching from near its outer or near end to the mold-board or share of the plow, as shown in Fig. 1.

The knife E is secured to the cutter by the bolts $e\ e$ passing through the slots $e'\ e'$ in the knife. These slots adapt the knife to be adjusted for closing more or less the slot C in the cutter, so that the colter will skip a greater or less number of plants, as desired.

Having thus fully described my invention, I claim as new and desire to secure by Letters Patent—

1. In a cotton-chopper, the combination, with the bell-shaped cutter B, provided with the slot C, of the drive-wheel D, cranks $d\ f$, rods F G, and bar J, substantially as described, and for the purpose set forth.

2. The combination, with the cutter B, provided with the slot C, of the knife E, adjustable in said slot, substantially as specified, whereby a greater or less number of plants will be left in the stand, as described.

3. The combination, with the plates $h\ h$, secured to the plow-beam, and the bar J, secured to the landside, of the bell-shaped cutter B, provided with the slot C, having adjustable knife E therein, shaft G, and means, substantially as set forth, to impart a rotary reciprocating movement to the cutter, substantially as described.

MARTIN SAMUEL MICHAELIS.

Witnesses:
F. A. LEONARD,
W. G. BERRY.